(12) United States Patent
Akimoto

(10) Patent No.: US 7,786,986 B2
(45) Date of Patent: Aug. 31, 2010

(54) IMAGE DISPLAY DEVICE

(75) Inventor: Hajime Akimoto, Kokubunji (JP)

(73) Assignee: Hitachi Displays, Ltd., Chiba (JP)

( * ) Notice: Subject to any disclaimer, the term of this patent is extended or adjusted under 35 U.S.C. 154(b) by 1072 days.

(21) Appl. No.: 11/094,757

(22) Filed: Mar. 31, 2005

(65) Prior Publication Data

US 2005/0225546 A1 Oct. 13, 2005

(30) Foreign Application Priority Data

Apr. 7, 2004 (JP) ............................. 2004-112727

(51) Int. Cl.
*G09G 5/00* (2006.01)
(52) U.S. Cl. ....................................... 345/207; 345/204
(58) Field of Classification Search ......... 345/173–179, 345/182, 183, 204–215, 87–104
See application file for complete search history.

(56) References Cited

U.S. PATENT DOCUMENTS

| | | | | |
|---|---|---|---|---|
| 6,069,393 A * | 5/2000 | Hatanaka et al. | ............ | 257/434 |
| 6,130,654 A * | 10/2000 | Hayashi et al. | ............ | 345/63 |
| 2002/0052192 A1 * | 5/2002 | Yamazaki et al. | ............ | 455/411 |
| 2002/0140650 A1 * | 10/2002 | Kai et al. | ............ | 345/87 |
| 2003/0076295 A1 * | 4/2003 | Nakajima | ............ | 345/156 |
| 2006/0092143 A1 * | 5/2006 | Kasai et al. | ............ | 345/175 |

OTHER PUBLICATIONS

Willem den Boer et al., "Active Matrix LCD with Integrated Optical Touch Screen". SID 03 Digest. pp. 1494-1497.

* cited by examiner

*Primary Examiner*—Kevin M Nguyen
*Assistant Examiner*—Cory A Almeida
(74) *Attorney, Agent, or Firm*—Stites & Harbison, PLLC; Juan Carlos A. Marques, Esq

(57) ABSTRACT

The invention is to provided an integrated, optical touch panel type image display device free from crosstalk with displayed images. The image display device according to the invention comprises a plurality of pixels having display brightness modulation means controlled with display signals, a display unit in which the plurality of pixels are arrayed, and a plurality of optical detecting means provided within the display unit wherein each of the optical detecting means comprises an optical detection diode for converting incident lights into signal electric-carriers, signal electric-carrier resetting means for resetting the signal electric-carriers, and output impedance modulating means for detecting the signal electric-carriers and modulating output impedances. The output impedance modulating means in the optical detecting elements are connected, in series between each other, to a Y output line and an X output line.

10 Claims, 14 Drawing Sheets

IMAGE DISPLAY DEVICE

CLAIM OF PRIORITY

The present application claims priority from Japanese Application JP 2004-112727, filed on Apr. 7, 2004, the content of which is incorporated by reference into this application.

FIELD OF THE INVENTION

The present invention relates to an image display device having optical detecting means.

BACKGROUND OF THE INVENTION

One example of the related art will be described below with reference to FIG. 21.

The structure of this example will be described first.

FIG. 21 shows the configuration of a conventional liquid crystal display having optical detecting means. Each pixel consists of a liquid crystal element 201, a storage capacitor 202 and a pixel switch 203. One end of the storage capacitor 202 is connected to a constant voltage line 204, and the other end is connected to one end of the pixel switch 203. The other end of the pixel switch 203 is connected to a signal line 206, and its gate is connected to a gate line 205.

So far is the configuration of a usual liquid crystal display, but this example is further provided with an optical detecting element 211 consisting of an optical detection TFT (thin-film transistor) 207, an optical signal electric-carrier capacitor 208 and a scan switch 209. The gate of the optical detection TFT 207 here is connected to a constant voltage line 204, and one end of the optical detection TFT 207 is connected to a scan switch 209 and at the same time to the constant voltage line 204 via the optical signal electric-carrier capacitor 208. The other end of the scan switch 209 is connected to an optical signal output line 210, and its gate is connected to the gate line 205. The other end of the optical signal output line 210 is entered into an integrator composed of a feedback capacitor 213, a reset switch 214 and a differential amplifier 212.

Next will be described the operation of this example of the related art.

Its operation is the same as that of a usual liquid crystal display as far as a signal voltage entered via the signal line 206 is written into the storage capacitor 202 in the pixel scanned by the gate line 205 and an image is displayed by the liquid crystal element 201 by manifesting optical characteristics according to the signal voltage.

Hereupon in this example of the related art, the optical signal electric-carrier capacitor 208 is scanned at the same time by the scanning of the gate line 205, and the optical signal electric-carrier stored in the optical signal electric-carrier capacitor 208 is entered into the integrator via the optical signal output line 210. The integrator buffers the signal electric-carrier stored in the optical signal electric-carrier capacitor 208 and outputs it as a voltage Vout. By this operation, the conventional display device can not only visually display the display signals but also output the optical image coming incident on the display screen as electric signals (see Non-Patent document 1 for instance).

[Non-Patent document 1] 2003 SID Digest of Technical Papers, pp. 1494-1497

SUMMARY OF THE INVENTION

In the example of the related art described above, in order to capture one frame of optical image, the gate line 205 needs to be scanned throughout. However, the gate line 205 is wired all over the display screen, and accordingly does not lend itself to high speed scanning. As a result, capturing one optical image basically requires a length of time equivalent to one frame. Since an image is always on the display screen, this gives rise to a problem that crosstalk inevitably occurs between the displayed image and the optical image to be captured. Especially for dot-type image inputting as in the case of a touch panel, this poses an input trouble.

One of the typical aspects of the invention disclosed in this application will be briefly summarized below. Thus, an image display device pertaining to the invention comprises a plurality of pixels having display brightness modulation means controlled with display signals, a display unit in which the plurality of pixels are arrayed, and a plurality of optical detecting means provided with in the display unit wherein:

each of the optical detecting means comprises optical sense means for converting incident lights into signal electric-carriers, signal electric-carrier resetting means for resetting the signal electric-carriers, output impedance modulating means for detecting the signal electric-carriers and modulating output impedances, and the output impedance modulating means of the plurality of optical detecting means are connected in series to each other.

DETAILED DESCRIPTION OF THE PREFERRED EMBODIMENTS

A number of preferred examples of the image display device pertaining to the present invention will be described in detail below with reference to accompanying drawings.

Embodiment 1

The configuration and operation of an image display device, which is the first preferred embodiment of the invention, will be successively described with reference to FIG. 1 through FIG. 11.

Figure 1:
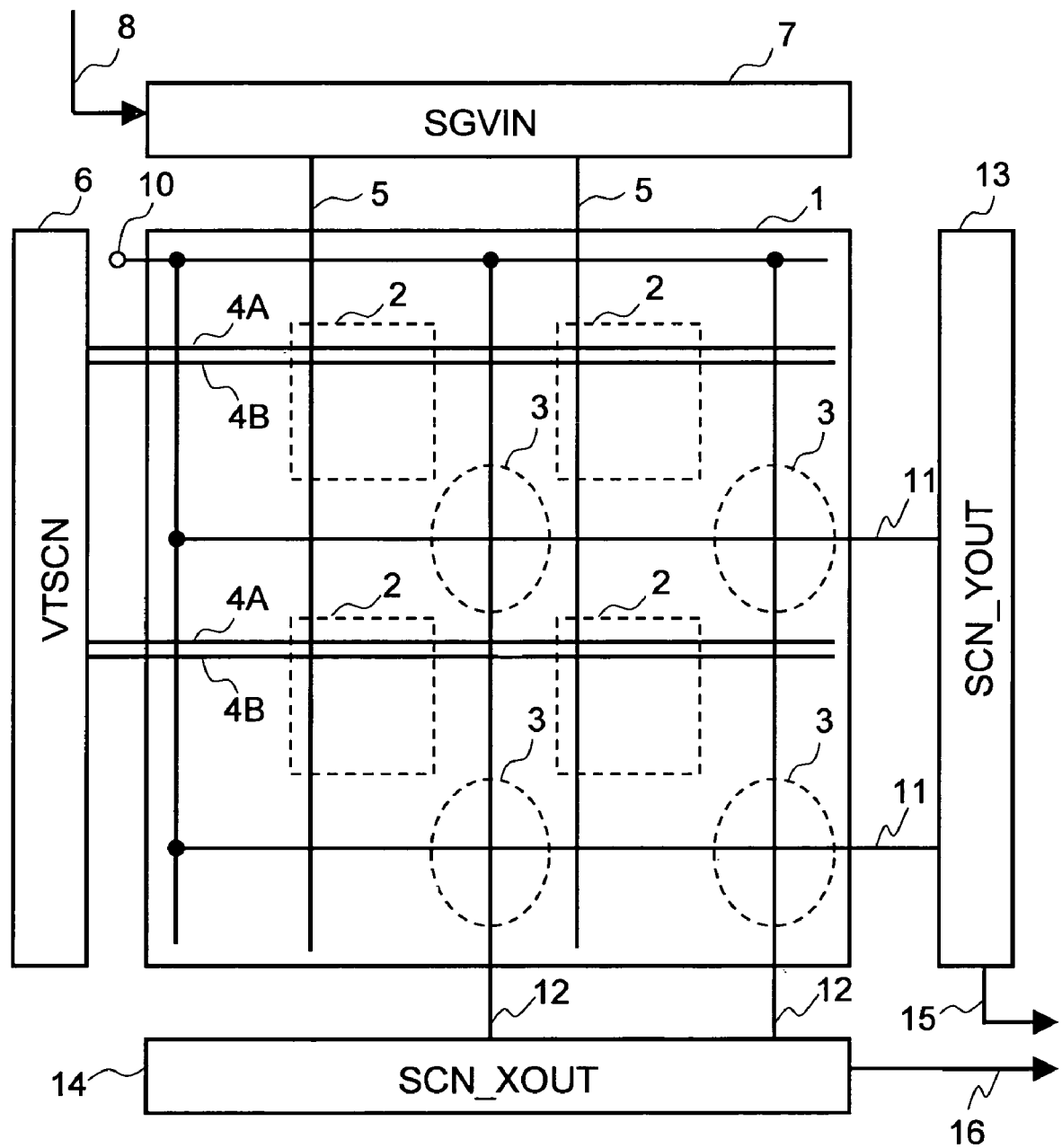
FIG. 1 shows the configuration of the display unit of a personal digital assistance, which is an image display device representing a first preferred embodiment of the present invention.

FIG. 1 shows the image display device, the first embodiment of the invention, in particular the display unit of a personal digital assistance having an optical touch panel. In a display area 1, pixels 2 are arranged in the shape of a matrix. To each of the pixels 2, a reset line 4A and a light-up line 4B are connected in the horizontal direction, and a signal line 5 is connected in the vertical direction. A vertical scanning circuit (VTSCN) 6 is provided at one end each of the reset line 4A and the light-up line 4B, and a signal voltage input circuit (SGVIN) 7, at one end of the signal line 5. A display signal input line 8 is connected to the signal voltage input circuit 7.

At the same time, optical detecting elements 3 are also disposed in the shape of a matrix in the display area 1. To each of the optical detecting elements 3, a Y output line 11 is connected in the horizontal direction and an X output line 12 is connected in the vertical direction. One end of the Y output line 11 is connected to a Y output scanning circuit (SCN_YOUT) 13, and one end of the X output line 12 is connected to an X output scanning circuit (SCN_XOUT) 14. Incidentally, the Y output scanning circuit 13 and the X output scanning circuit 14 output to a Y output line 15 and an X output line 16, respectively. The other ends of the Y output line 11 and the X output line 12 are commonly connected to a high voltage source terminal 10.

Next will be described the configuration of the pixel 2.

Figure 2:
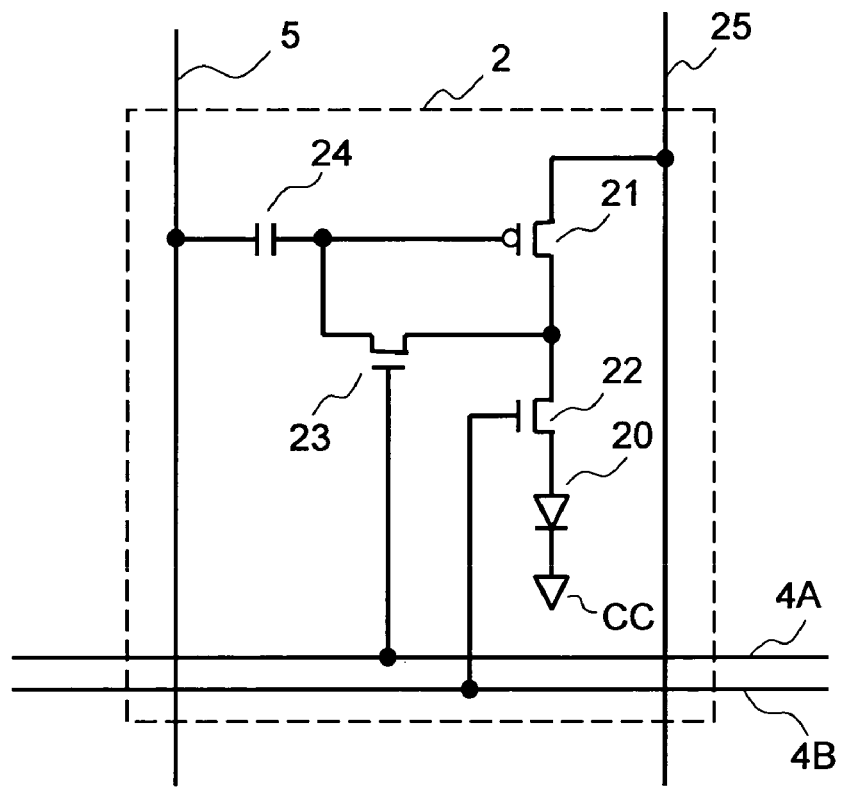
FIG. 2 shows the configuration of a pixel in the first preferred embodiment.

FIG. 2 shows the configuration of the pixel 2. One end of a storage capacitor 24 is connected to the signal line 5, and the other end of the storage capacitor 24 is connected to the gate of a p-type poly-crystal drive TFT 21. The source of the drive TFT 21 is connected to a power supply line 25, and its drain is connected to an organic EL (electro-luminescence) light emitting element 20 via a light-up switch 22, which is an n-type poly-crystal drive TFT. The other end of the organic EL light emitting element 20 is connected to a common cathode CC. Further, a reset switch 23, which is another n-type poly-crystal drive TFT, is connected between the drain and the gate of the drive TFT 21, and the gates of the light-up switch 22 and of the reset switch 23 are connected to the light-up line 4B and the reset line 4A, respectively.

Next will be described the configuration of the optical detecting element 3.

Figure 3:
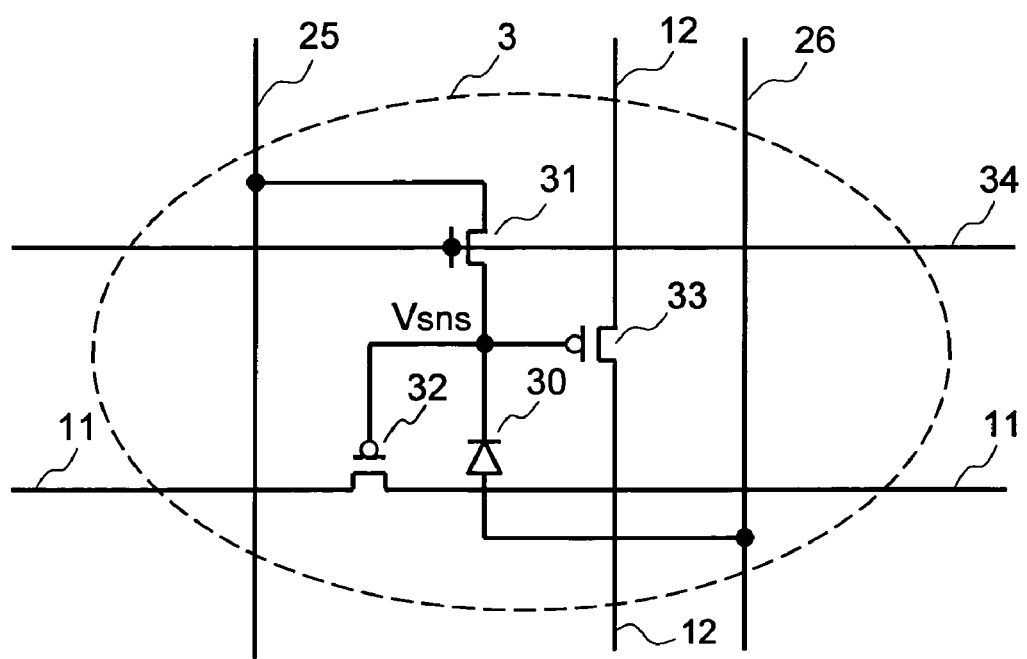
FIG. 3 shows the configuration of an optical detecting element in the first embodiment.

FIG. 3 shows the configuration of the optical detecting element 3. One end of a detection element reset switch 31, which is an n-type poly-crystal Si-TFT, is connected to the power supply line 25, and the other end of the detection element reset switch 31 is connected to the gate of an X output TFT 33, which is an n-type poly-crystal Si-TFT, the gate of a Y output TFT 32, which is a p-type poly-crystal Si-TFT, and an optical detection diode 30, which is a poly-crystal Si thin film diode. The other end of the optical detection diode 30 is connected to a low voltage power supply line 26. A detection element reset line 34 is connected to the gate of the detection element reset switch 31, and the Y output line 11 and the X output line 12 are connected to both ends of the Y output TFT 32 and both ends of the X output TFT 33, respectively.

Hereupon, the physical structure of the optical detecting element 3 will be described with reference to FIG. 4 and FIG. 5.

Figure 4:
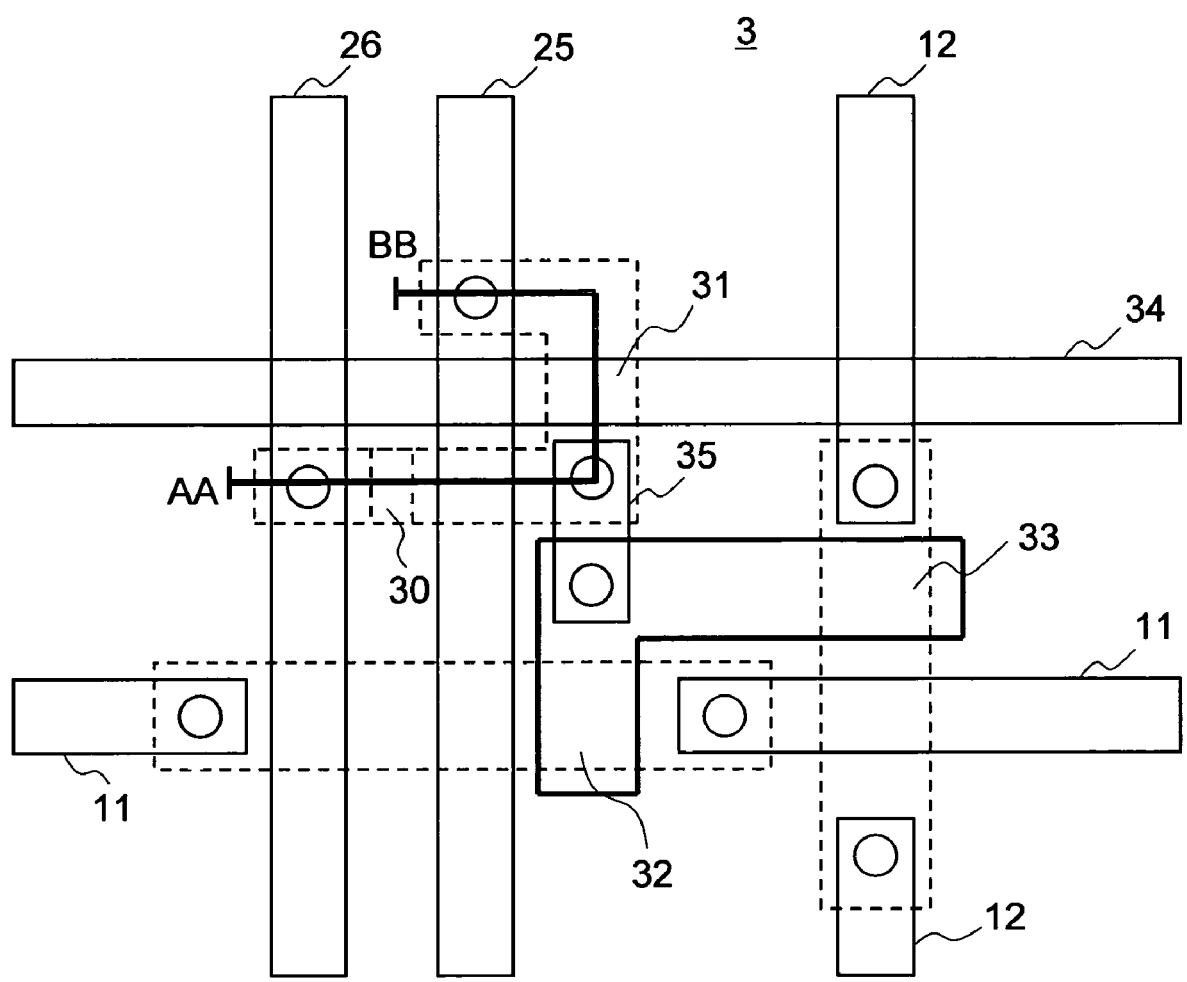
FIG. 4 shows the layout of the optical detecting element in the first embodiment.

FIG. 4 shows the layout of the optical detecting element 3, wherein thin solid lines represent aluminum (Al) wiring; thick solid lines, gate wiring; broken lines, poly-crystal Si islands; and circles, contact holes. It is therefore seen that the detection element reset switch 31, the Y output TFT 32 and the X output TFT 33 are realized as areas where thick solid lines and broken lines cross. Incidentally, Al wiring 35 here is a structural element for connecting poly-crystal Si islands and TFT gate electrodes.

Figure 5:
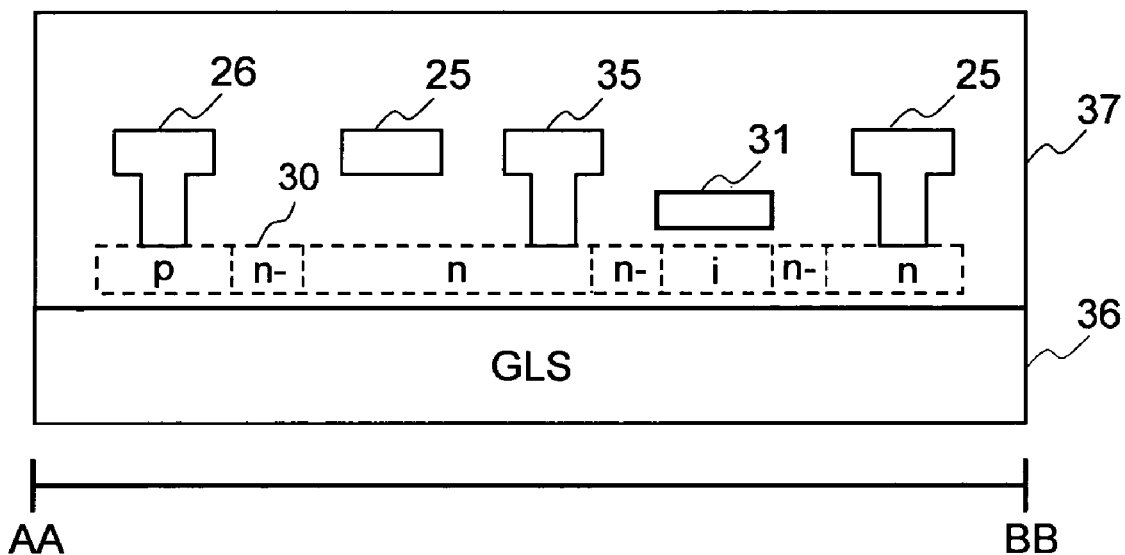
FIG. 5 shows the sectional structure of the part along line AA-BB in FIG. 4.

FIG. 5 shows the sectional structure of the part along line AA-BB in FIG. 4. A display unit 37 itself is disposed over a glass substrate (GLS) 36, and one poly-crystal Si island is formed between AA and BB above. The poly-crystal Si island is doped with p-type and n-type impurities as illustrated excepted in the non-doped region i immediately underneath the gate of the detection element reset switch 31, and the optical detection diode 30 is also fabricated in this way. An n-region is arranged in the channel region at the gate edge of the detection element reset switch 31. This n-region provides the detection element reset switch 31 with an LDD (lightly doped drain) structure for reducing off-currents.

Next will be described the operation of this display unit with reference to FIG. 6 through FIG. 9.

Figure 6:
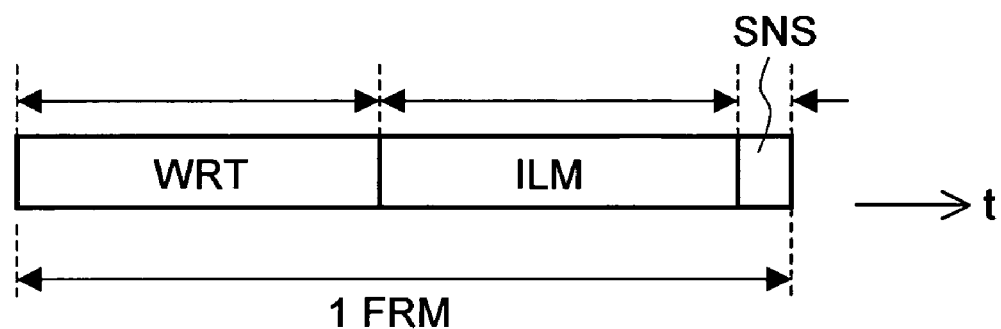
FIG. 6 shows the configuration of one frame in the first embodiment.

FIG. 6 shows the configuration of one frame (FRM) in this display unit. One frame period consists of three periods including a write period WRT, a light emission period ILM, and a detection period SNS as illustrated therein. In FIG. 6, time t proceeds from left to right. The operation in this each period will be described below in due sequence.

Figure 7:
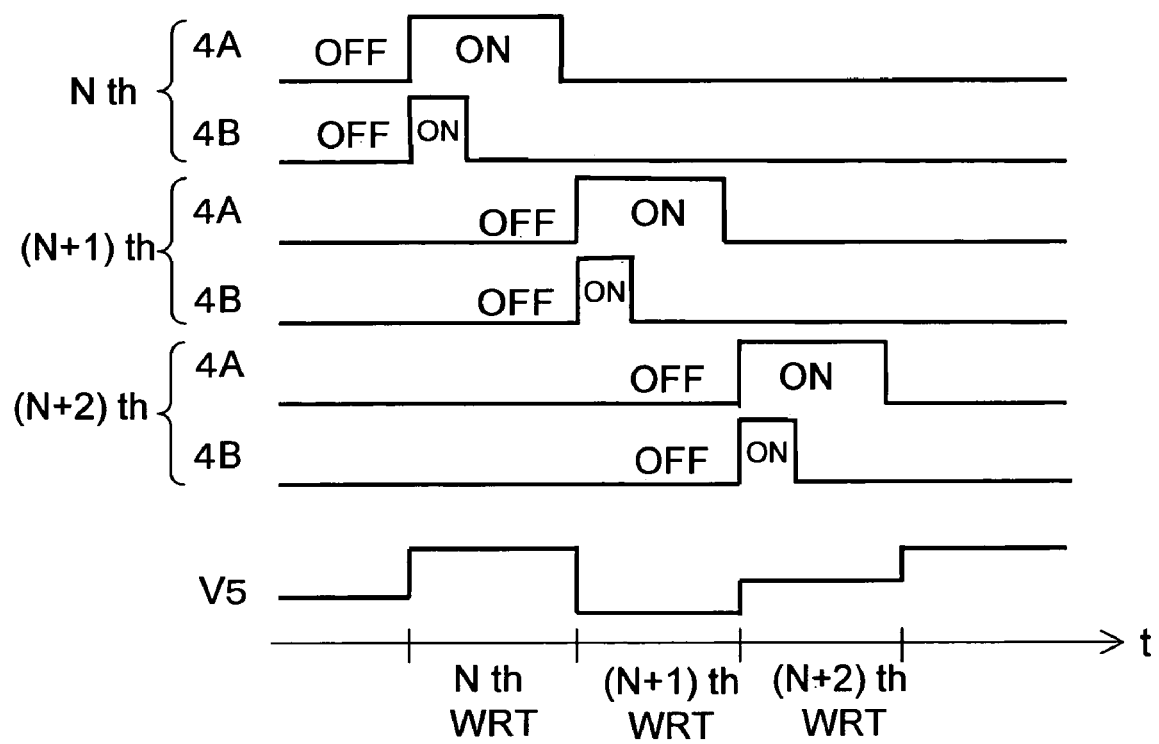
FIG. 7 is an operational timing chart of the write period in the first embodiment.

FIG. 7 is an operational timing chart of the write period WRT, wherein the upper part shows that the TFTs whose gates are connected to the reset line 4A and the light-up line 4B are on, and the lower part, they are off. The voltage V5 of the signal line 5 is high in the upper part and low in the lower part. This is a period in which a display signal voltage is written into each pixel 2, and FIG. 7 shows writing onto three lines including the N-th, (N+1)-th and (N+2)-th. In writing onto the N-th line, first the reset line 4A and the light-up line 4B are turned on, and at this time a display signal voltage is applied to the signal line 5. When the reset line 4A and the light-up line 4B are tuned on, the drive TFT 21 is diode-connected and connected in series to the organic EL element 20 in the pixel 2.

Then, when the light-up line 4B is turned off, the light-up switch 22 is turned off, and the gate voltage of the drive TFT 21 becomes stabilized when it reaches a threshold voltage Vth. When this takes place, a display signal voltage is applied to the other end of the storage capacitor 24. When the reset line 4A turns off the reset switch 23 hereupon, the storage capacitor 24 stores a state in which the threshold voltage Vth of the drive TFT 21 is generated on the gate side of the drive TFT 21 when the display signal voltage is applied to the signal line 5 side. What has been described so far is the writing of the display signal voltage onto one line of the pixel 2, and the same operation is repeated for each subsequent line.

Figure 8:
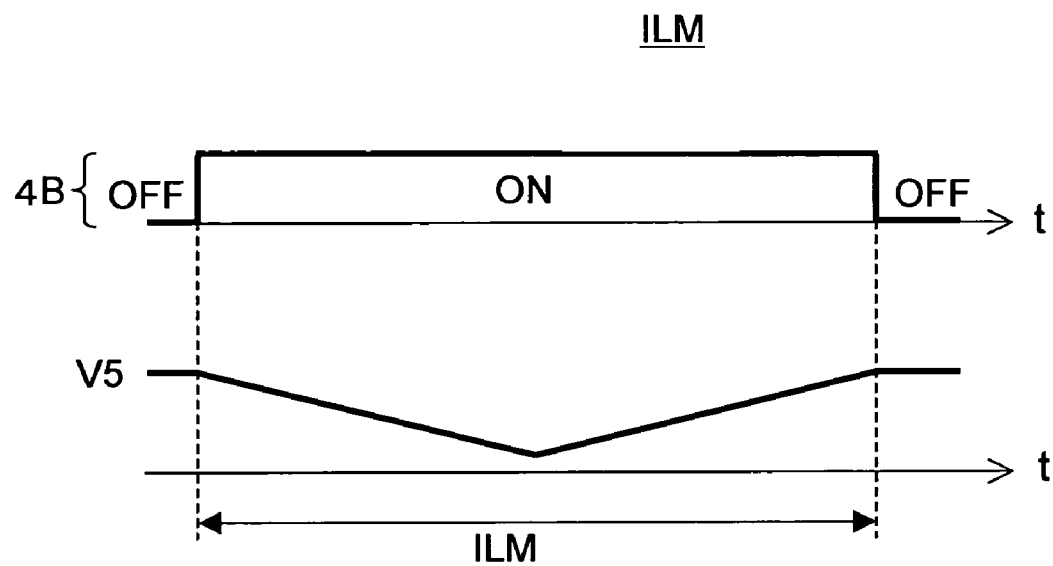
FIG. 8 is an operational timing chart of the light emission period in the first embodiment.

Next, FIG. 8 is an operational timing chart of the light-up line 4B and the signal line 5 in the light emission period ILM wherein, as in FIG. 7, the upper part shows an ON state and the lower part, an OFF state. This also applies to the voltage V5 of the signal line 5, which is high in the upper part and low in the lower part. This is the light emission period for each pixel 2, and the light-up switch 22 of every pixel is turned as every the light-up line 4B is turned on.

If a triangular waveform as shown in FIG. 8 is entered here as the voltage V5 of the signal line 5, the drive TFT 21 of each pixel will remain off as long as the voltage of the triangular waveform is higher than the prewritten display signal voltage, and will become off when the voltage of the triangular waveform becomes lower than the prewritten display signal voltage. Thus, the light emission period of the organic EL element 20 can be modulated with the prewritten display signal voltage, and light emission display matching the display signal voltage is thereby made possible without being affected by any fluctuation in the characteristics of TFTs constituting the pixel 2.

Figure 9:
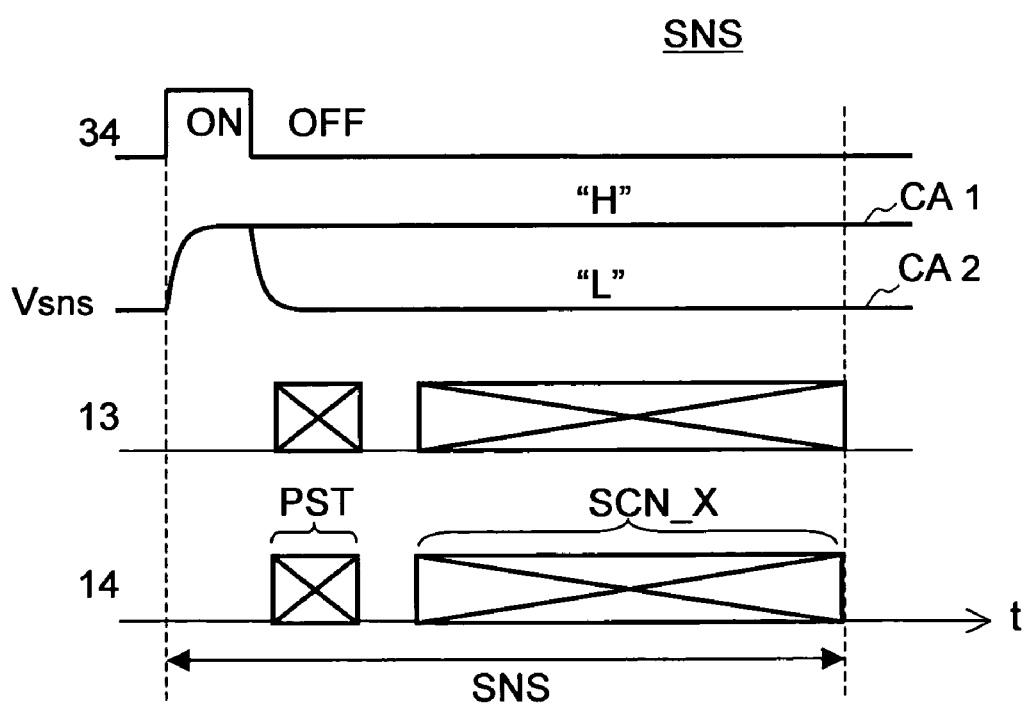
FIG. 9 is an operational timing chart of the detection period in the first embodiment.

Next, FIG. 9 is an operational timing chart of the detection period SNS, wherein, as in FIG. 7, the upper part shows the ON state of the detection element reset line 34 and the lower part, the OFF state of the same. Vsns denotes the detection voltage, which is the voltage at the two ends of the optical detection diode 30, the upper line representing the high level and the lower, the low level. The operations of the Y output scanning circuit 13 and the X output scanning circuit 14 are also shown in this chart, but they will be described afterwards with reference to FIG. 10.

This is a period of optical detection, wherein the pixel is not lit as every light-up line 4B shown in FIG. 8 is turned off. In this period, first, as the detection element reset line 34 remains ON for a certain duration and the detection element reset switch 31 is turned on, a reset voltage is applied to both ends of the optical detection diode 30. After that, when the detection element reset line 34 is turned off and the detection element reset switch 31 is also turned off, the detection voltage Vsns of the optical detection diode 30 remains at the high level "H" if no light comes incident as indicated on (CA1) or drops to the low level "L" if any light comes incident as indicated on (CA2).

As the voltage of the optical detection diode 30 is then applied as it is to the gates of the Y output TFT 32 and the X output TFT 33, which are p-type TFTs, in the case of CA1 wherein no light comes incident, the Y output TFT 32 and the X output TFT 33 remain off or, in the case of CA2 wherein a light does come incident, the Y output TFT 32 and the X output TFT 33 vary to an ON state.

As the drain-source routes of the Y output TFT 32 and the X output TFT 33 here are connected in series by the Y output line 11 and the X output line 12, respectively, if any of the optical detecting elements 3, connected in series as shown in FIG. 1, is not irradiated with light or is irradiated only at a low level of brightness, the outputs themselves of the Y output line 11 and the X output line 12 will take on high impedances. By detecting them in the X and Y directions, the address of the optical detecting element 3 not irradiated with light or irradiated only at a low level of brightness can be readily found out.

This address detection structure will be described below with reference to FIG. 10.

Figure 10:
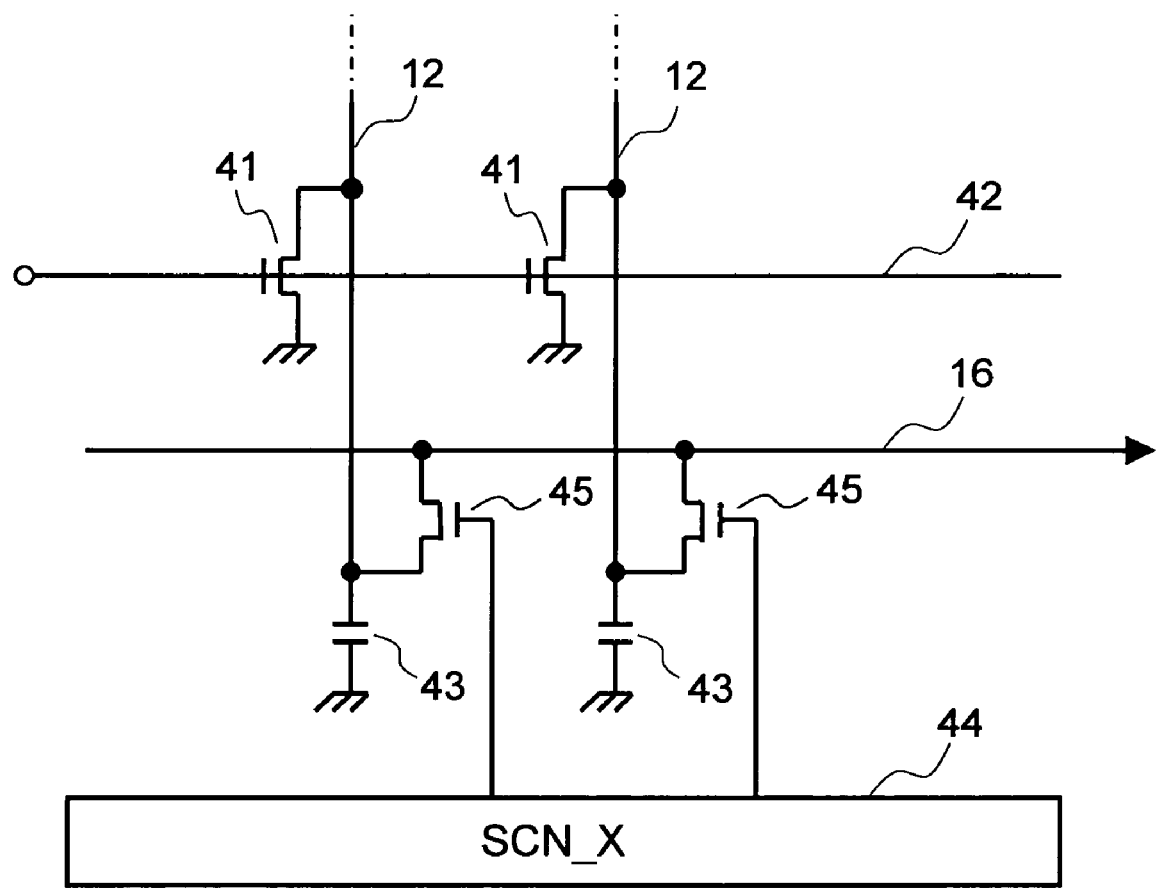
FIG. 10 shows the configuration of an X output scanning circuit in the first embodiment.

FIG. 10 shows the configuration of the X output scanning circuit 14 shown in FIG. 1. One end of a preset switch 41 controlled with a preset line 42 is connected to the X output line 12 entered in parallel, while the other end of the preset line 41 is grounded. Further, an end of the X output line 12 is grounded via an X output line capacitor 43, and is connected to an X signal output line 16 via an X scan switch 45. Incidentally, the gate of the X scan switch 45 here is successively scanned by an X scanning circuit (SCN_X) 44.

The X output scanning circuit 14 operates as shown in FIG. 9. After the detection element reset line 34 is turned off, the preset switch 41 controlled with the preset line 42 is turned on to preset (PST) the X output line capacitor 43. After that, if the output of the X output line 12 is at a low impedance, the X output line capacitor 43 will be returned to a high voltage by a power source provided at the other end of the X output line 12, but if the output of the X output line 12 is at a high impedance, the X output line capacitor 43 will remain preset to a low voltage. By successively reading the capacitances of the X output line capacitors 43 then by scanning with the X scanning circuit 44, it can be determined whether or not there is any which is not irradiated with light or irradiated only at a low level of brightness among the optical detecting elements 3 on the pertinent line. Incidentally, description of the operation of the Y output scanning circuit 13 is dispensed with here because it is the same as that of the X output scanning circuit 14.

Whereas detection of lights from the optical detecting elements 3 are detected within one frame in this embodiment as described above, since the scanning by the X scanning circuit 44 and the Y scanning circuit is only to scan the X output line capacitors 43 and the Y output line capacitors, it can be completed in a short period of time substantially equal to one horizontal period. This detection period SNS is only about, for instance, 50 μsec to 100 μsec. Furthermore, since light emission of every pixel is stopped during this optical detection period, there is no possibility for crosstalk from the displayed image to optical detection to arise. Since optical detection is possible only in a very short period of time in this embodiment, crosstalk can be avoided by stopping light emission during the detection period.

Next will be described the overall configuration and operation of a personal digital assistance having the optical touch panel which constitutes this embodiment of the invention.

Figure 11:
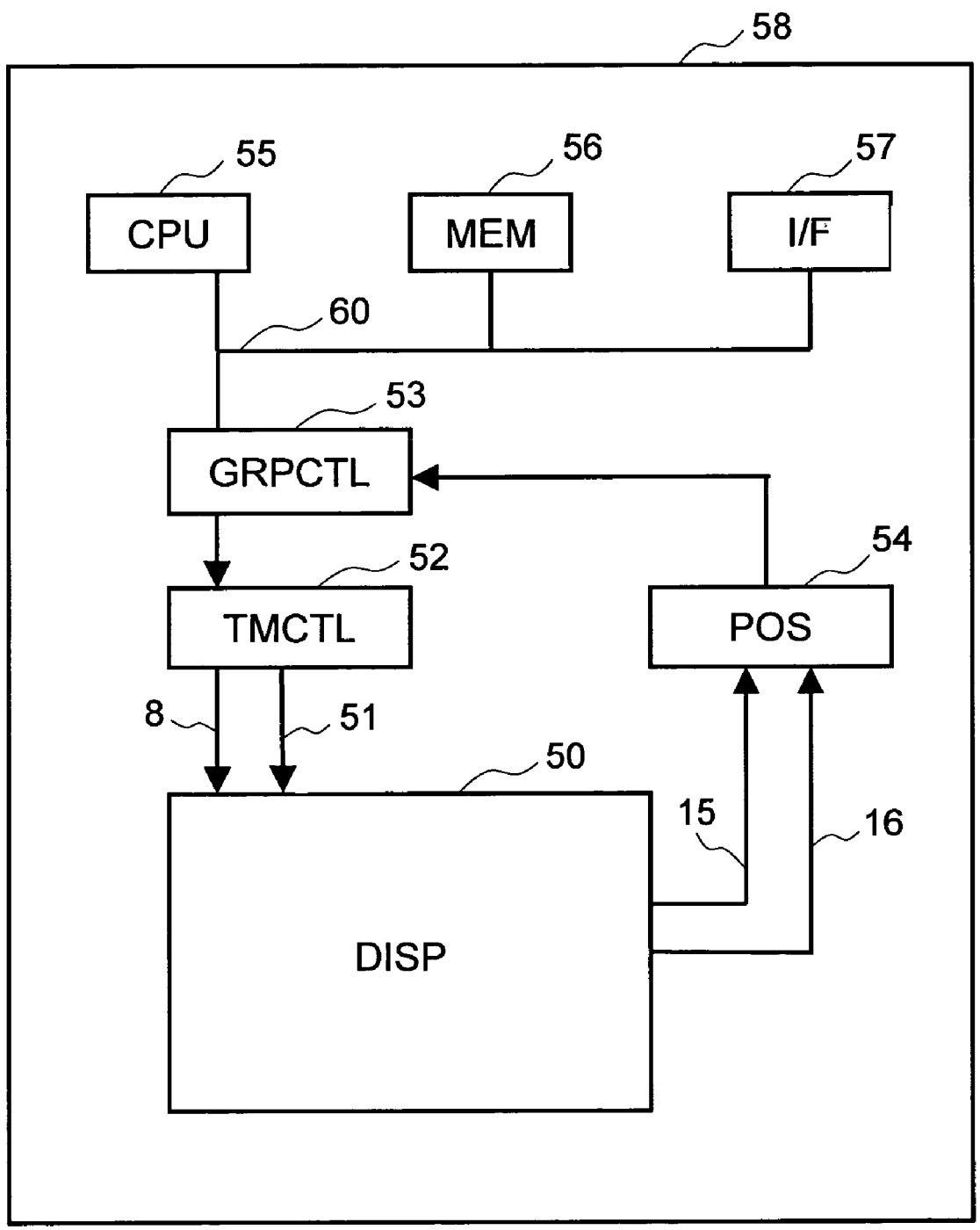
FIG. 11 shows the overall configuration of the personal digital assistance in the first embodiment.

FIG. 11 shows the overall configuration of the personal digital assistance having the optical touch panel which constitutes this embodiment. Within a personal digital assistance 58, a CPU (central processing unit) 55, a frame memory (MEM) 56, numeric keys and a wireless input interface circuit (I/F) 57 are connected to a graphic control circuit (GRPCTL) 53 by a system bus 60. The output of the graphic control circuit 53 is entered into a timing control circuit (TMCTL) 52, and the display signal input line 8 and a prescribed control signal line 51 are connected from the timing control circuit 52 to a display unit (DISP) 50.

Details of the display unit 50 here have already been described. Outputs are provided from the display unit 50 to the Y signal output line 15 and the X signal output line 16, and they are entered into the graphic control circuit 53 via a position detection circuit (POS) 54.

Next will be described the operation of this embodiment.

When a prescribed instruction is entered from the input interface circuit 57 to the CPU 55 via the system bus 60, the CPU 55 operates the frame memory 56 in accordance with this instruction, and transfers necessary instructions and display data to the graphic control circuit 53. Here upon, the graphic control circuit 53 enters prescribed instructions and display data into the timing control circuit 52, which converts these signals into signals having prescribed voltage amplitudes, and transfers control signals and display signals to circuits disposed on a glass substrate, which constitutes the display unit 50. The display unit 50 displays the transferred display signals and, at the same time, supplies optical touch panel outputs to the Y signal output line 15 and the X signal output line 16 from time to time as requested.

The position detection circuit 54 extracts from these outputs touch input address information entered with a finger, stick or the like, and feeds back the obtained touch input address information to the graphic control circuit 53 on a real time basis. In response to this, the CPU 55 judges what kind of touch input instructions has been entered and alters the display signals as required. Such alterations may include, for instance, altering the part of the displayed image corresponding to the touched part.

The design of the embodiment of the invention so far described can obviously be modified in various ways without deviating from the spirit of the invention. For instance, the glass substrate used as the TFT substrate can be replaced with some other transparent insulating substrate, such as a quartz glass substrate or a transparent plastic substrate. Or an opaque substrate can as well be used if the organic EL light emitting element 13 is structured for top emission.

Any mention of the number of pixels, panel size and similar factors was intentionally refrained from the foregoing description of this embodiment, because the invention is not confined to these specifications or formats. Regarding the number of displayed pixels, the optical opening for displayed pixels can obviously be expanded by appropriately reducing the number of optical detecting elements.

Further in this embodiment, though organic EL elements are used in the pixel part, liquid crystal display elements can as well be used in place of them. In this case, optical detection free from crosstalk of the displayed image can be made possible by fully turning off the back light. If not full turning-off, the brightness can be reduced low enough to make crosstalk negligible. In this case, obviously it is preferable for the brightness of light emission in the optical detection part to be as uniform as practicable.

Further in this embodiment, though n-type poly-crystal drive Si-TFTs are used as the detection element reset switches 31, evidently the voltage of the detection element reset line 34 can be reduced by replacing them with p-type poly-crystal drive Si-TFTs.

These various modifications are not confined to this embodiment, but can basically be applied to the other embodiments to be described below.

Embodiment 2

Another image display device, which is a second preferred embodiment of the present invention, will be described below with reference to FIG. 12 and FIG. 13, As the basic structure and operation of a personal digital assistance having the optical touch panel, which is the second embodiment, are the same as those of the first embodiment already described, and this embodiment differs from the first embodiment in the structure and operation of the optical detecting elements, these differences will be described below.

Figure 12:
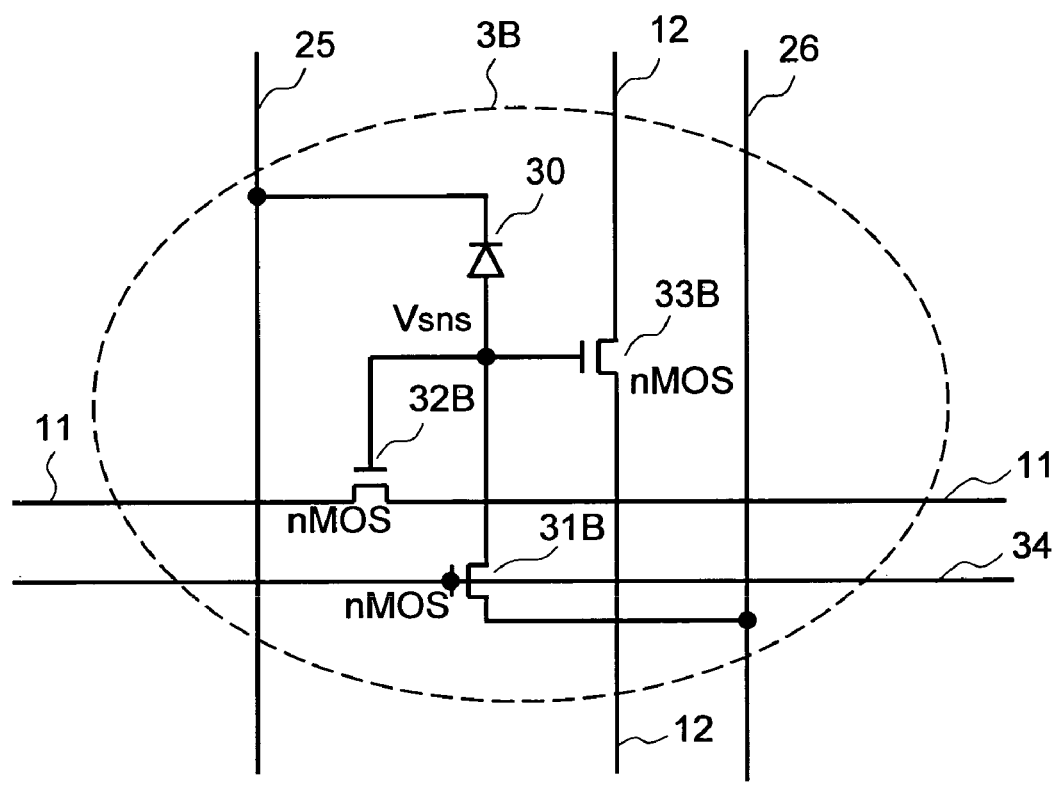
FIG. 12 shows the configuration of an optical detecting element in a second preferred embodiment of the invention.

FIG. 12 shows the configuration of an optical detecting element 3B. The cathode of the optical detection diode 30, which is a poly-crystal Si thin film diode, is connected to the power supply line 25, and the gate of an X output TFT 33B, which is an n-type poly-crystal drive Si-TFT, the gate of a Y output TFT 32B, which is another n-type poly-crystal drive Si-TFT, and one end of a detection element reset switch 31B, which is still another n-type poly-crystal drive Si-TFT, are connected to the anode of the optical detection diode 30. The other end of the detection element reset switch 31B is connected to the low voltage power supply line 26. The detection element reset line 34 is connected to the gate of the detection element reset switch 31B, and the Y output line 11 and the X output line 12 are connected to the two ends of the Y output TFT 32B and those of the X output TFT 33B, respectively.

Next will be described the operation of the optical detecting element 3B.

Figure 13:
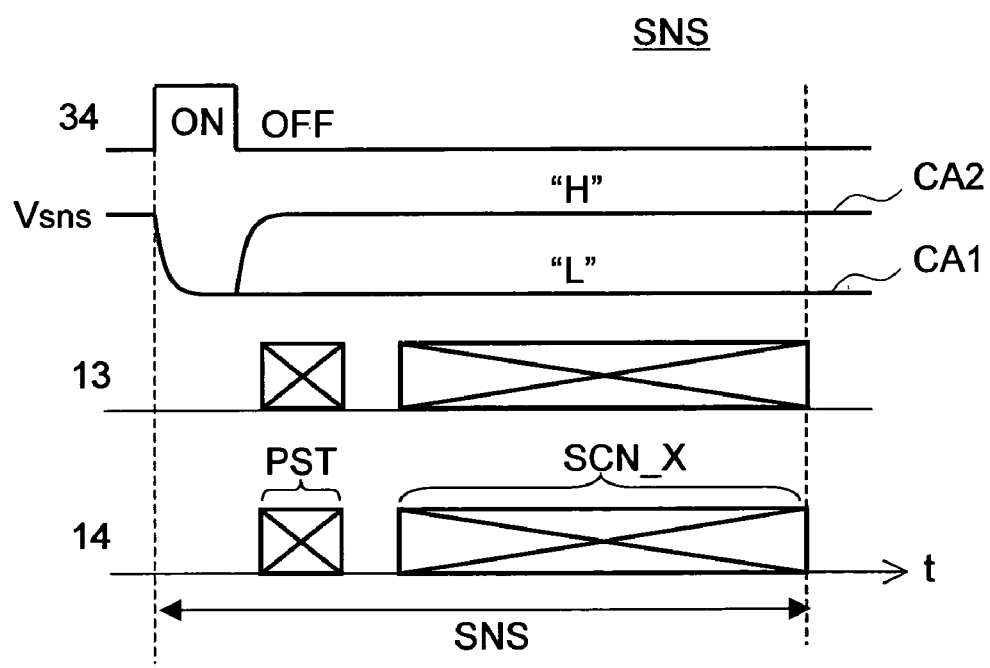
FIG. 13 is an operational timing chart of the detection period in the second embodiment.

FIG. 13 is an operational timing chart of the detection period SNS, wherein the upper level of the detection element reset line 34 represents ON and the lower level represents OFF. Incidentally, Vsns denotes the detection voltage, which is the voltage on the anode side of the optical detection diode 30, the upper line representing the high voltage and the lower, the low voltage. This is a period of optical detection, wherein the pixel is not lit as every light-up line 4B is turned off as in the first embodiment.

In this period, first, as the detection element reset line 34 remains ON for a certain duration and the detection element reset switch 31B is turned on, the anode voltage Vsns of the optical detection diode 30 is reset to a low level. After that, when the detection element reset line 34 is turned off and the detection element reset switch 31B is also turned off, the anode voltage of the optical detection diode 30 remains at the low level "L" if no light comes incident as indicated on (CA1) or rises to the high level "H" if any light comes incident as indicated on (CA2).

The anode voltage Vsns of the optical detection diode 30 is then applied as it is to the gates of the Y output TFT 32B and the X output TFT 33B, which are n-type TFTs. Therefore, if no light comes incident, the Y output TFT 32B and the X output TFT 33B will remain off or, if a light comes incident, the Y output TFT. 32B and the X output TFT 33B vary to an ON state. As the Y output TFT 32B and the X output TFT 33B here are connected in series by the Y output line 11 and the X output line 12, respectively if any of the optical detecting elements 3, which are connected in series, is not irradiated with light or is irradiated only at a low level of brightness, the outputs themselves of the Y output line 11 and the X output line 12 will take on high impedances. By detecting them in the X and Y directions, the address of the optical detecting element 3 not irradiated with light or irradiated only at a low level of brightness can be readily found out as in the first embodiment.

Embodiment 3

Still another image display device, which is a third preferred embodiment of the present invention, will be described below with reference to FIG. 14 and FIG. 15.

As the basic structure and operation of a personal digital assistance having the optical touch panel, which is the third embodiment, are the same as those of the second embodiment already described, and this embodiment differs from the second embodiment in the structure and operation of the optical detecting elements, these differences will be described below.

Figure 14:
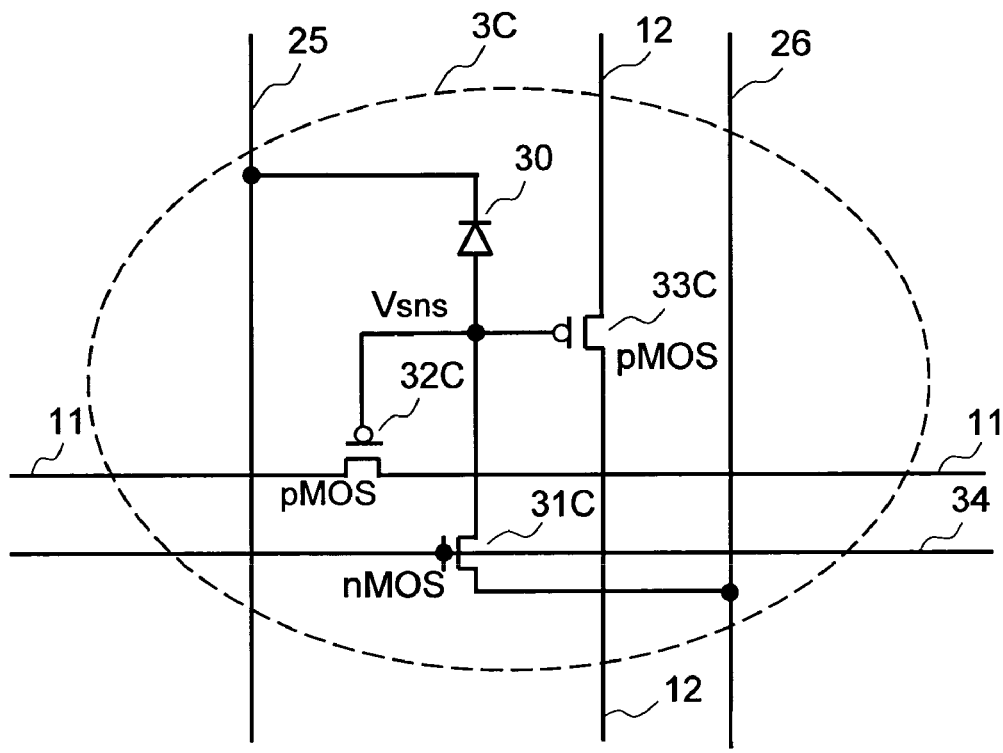
FIG. 14 shows the configuration of an optical detecting element in a third preferred embodiment.

FIG. 14 shows the configuration of an optical detecting element 3C. The optical detection diode 30, which is a poly-crystal Si thin film diode, is connected to the power supply line 25, and the gate of an X output TFT 33C, which is a p-type poly-crystal drive Si-TFT, the gate of a Y output TFT 32C, which is another p-type poly-crystal drive Si-TFT, and a detection element reset switch 31C, which is an n-type poly-crystal drive Si-TFT, are connected to the anode of the optical detection diode 30. The other end of the detection element reset switch 31C is connected to the low voltage power supply line 26. The detection element reset line 34 is connected to the gate of the detection element reset switch 31C, and the Y output line 11 and the X output line 12 are connected to the two ends of the Y output TFT 32C and to those of the X output TFT 33C, respectively.

Next will be described the operation of the optical detecting element 3C.

Figure 15:
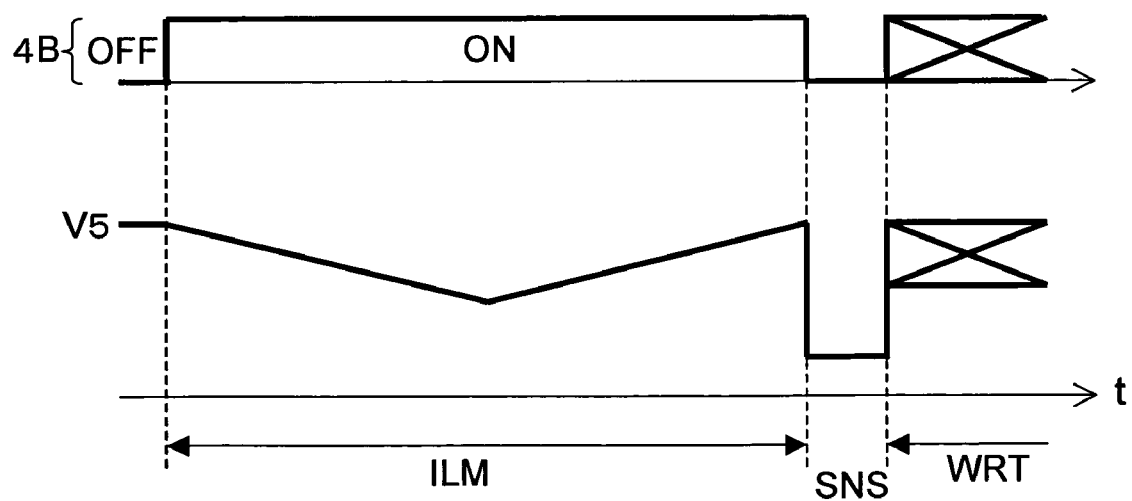
FIG. 15 is an operational timing chart of the light emission period, the detection period and the write period in the third embodiment.

FIG. 15 is an operational timing chart of the detection period SNS, light emission period ILM and the write period WRT, wherein the upper level of the light-up line 4B represents ON and the lower level represents OFF. Regarding the voltage V5 of the signal line 5, the upper line represents the high voltage and the lower represents the low voltage. To compare here FIG. 15 with FIG. 8, which is the timing chart of the first embodiment, it is seen that the voltage V5 of the signal line 5 is at the low level in the detection period SNS. This results in light emission from every pixel in the detection period SNS.

To compare this embodiment with the second, the X output TFT 33C and the Y output TFT 32C are p-type, instead of n-type, poly-crystal drive Si-TFTs. For this reason, the outputs of this embodiment are such that the Y output TFT 32C and the X output TFT 33C remain ON when no light comes incident, while the Y output TFT 32C and the X output TFT 33C vary to OFF when a light comes incident. As the Y output TFT 32C and the X output TFT 33C here are connected in series by the Y output line 11 and the X output line 12, respectively, if any of the optical detecting elements 3, which are connected in series, is irradiated with light or is irradiated at a high level of brightness, the outputs themselves of the Y output line 11 and the X output line 12 will take on high impedances.

Since every pixel emits light during the detection period in this embodiment, if anything is in contact with the display, reflection from that part will become greater to make that part as if its brightness were increased. Therefore, a touch panel function can be realized in this embodiment by detecting that high brightness part. In particular, even if the brightness in the surrounding environment is low, a highly sensitive touch panel function can be realized in this embodiment.

To add, it is evidently possible to let external light-intercepting type optical detection as in the second embodiment and contact part-reflecting type optical detection as in this embodiment coexist in a single display, and to use either of the two types as desired.

Embodiment 4

Yet another image display device, which is a fourth preferred embodiment of the present invention, will be described below with reference to FIG. 16 and FIG. 17.

As the basic structure and operation of a personal digital assistance having the optical touch panel, which is the fourth embodiment, are the same as those of the first embodiment already described, and this embodiment differs from the first embodiment in the structure and operation of the optical detecting elements, these differences will be described below.

Figure 16:
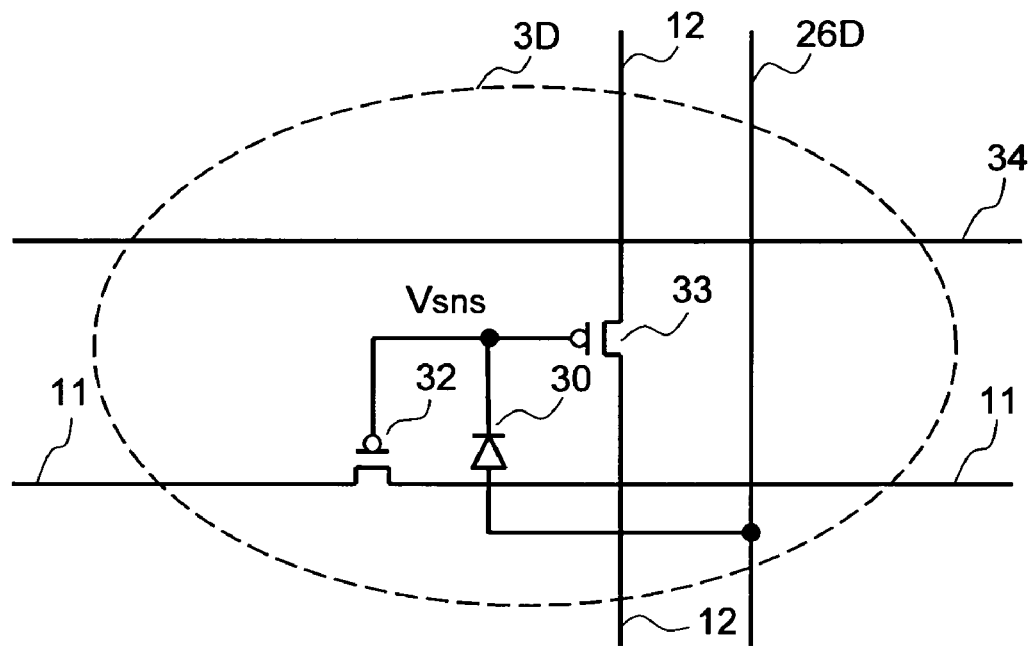
FIG. 16 shows the configuration of an optical detecting element in a fourth preferred embodiment.

FIG. 16 shows the configuration of an optical detecting element 3D. The optical detection diode 30, which polycrystal Si thin film diode, is connected to a power supply line 26D, and the gate of the X output TFT 33, which is a p-type poly-crystal drive Si-TFT, and the gate of the Y output TFT 32, which is another p-type poly-crystal drive Si-TFT, are connected to the other end of the optical detection diode 30. The Y output line 11 and the X output line 12 are connected to the two ends of the Y output TFT 32 and to those of the X output TFT 33, respectively.

Next will be described the operation of the optical detecting element 3D.

Figure 17:
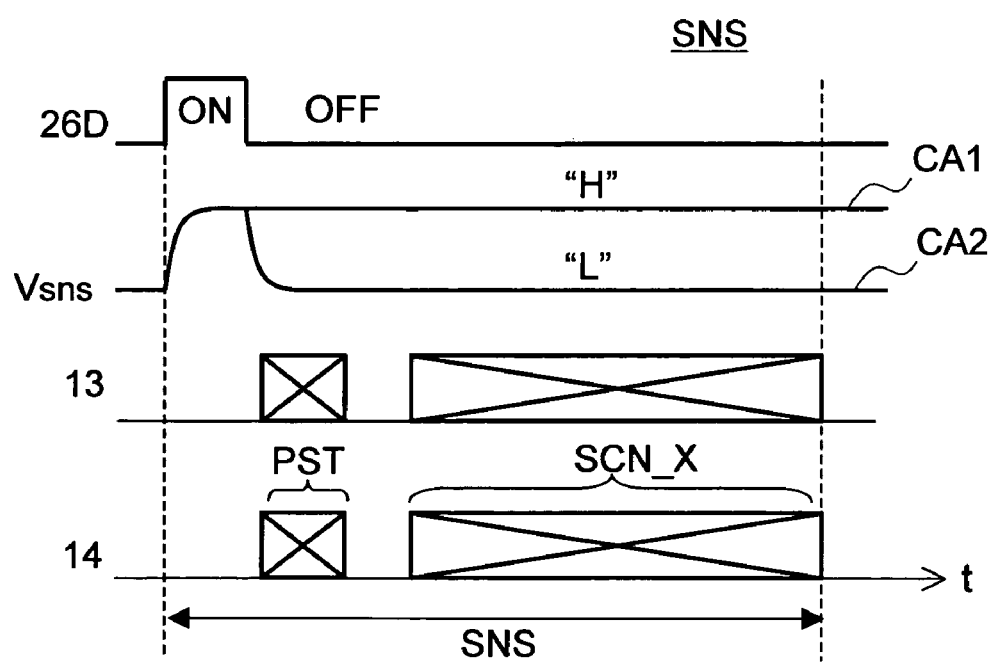
FIG. 17 is an operational timing chart of the detection period in the fourth embodiment.

FIG. 17 is an operational timing chart of the detection period SNS, wherein the upper level of the power supply line 26D represents ON (high voltage) and the lower level represents OFF (low voltage). Incidentally, Vsns denotes the detection voltage, which is the voltage on the cathode side of the optical detection diode 30 here, the upper line representing the high voltage and the lower represents the low voltage.

This is a period of optical detection, wherein no pixel is lit as every light-up line 4B is turned off as in the first embodiment.

In this period, first, as the power supply line 26D remains ON for a certain duration and the optical detection diode 30 is biased in the forward direction, the cathode voltage of the optical detection diode 30 is reset to a high level. After that, when the power supply line 26D is turned off, the cathode voltage Vsns of the optical detection diode 30 remains at the high level "H" if no light comes incident as indicated on (CA1) or drops to the low level "L" if any light comes incident as indicated on (CA2). The cathode voltage Vsns of the optical detection diode 30 is then applied as it is to the gates of the Y output TFT 32 and the X output TFT 33, which are p-type TFTs. Therefore, if no light comes incident, the Y output TFT 32 and the X output TFT 33 will remain off or, if a light comes incident, the Y output TFT 32 and the X output TFT 33 vary to an ON state. As the Y output TFT 32 and the X output TFT 33 here are connected in series by the Y output line 11 and the X output line 12, respectively, if any of the optical detecting elements 3, which are connected in series, is not irradiated with light or is irradiated only at a low level of brightness, the outputs themselves of the Y output line 11 and the X output line 12 will take on high impedances. By detecting them in the X and Y directions, the address of the optical detecting element 3D not irradiated with light or irradiated only at a low level of brightness can be readily found out as in the first embodiment.

This embodiment has an advantage that the structure of the optical detecting elements can be simplified and a large display pixel area can be secured by making the power supply line 26D variable.

Embodiment 5

Still another image display device, which is a fifth preferred embodiment of the present invention, will be described below with reference to FIG. 18.

As the basic structure and operation of a personal digital assistance having the optical touch panel, which is the fifth embodiment, are the same as those of the fourth embodiment already described, and this embodiment differs from the fourth embodiment in the structure and operation of the optical detecting elements, these differences will be described below.

Figure 18:
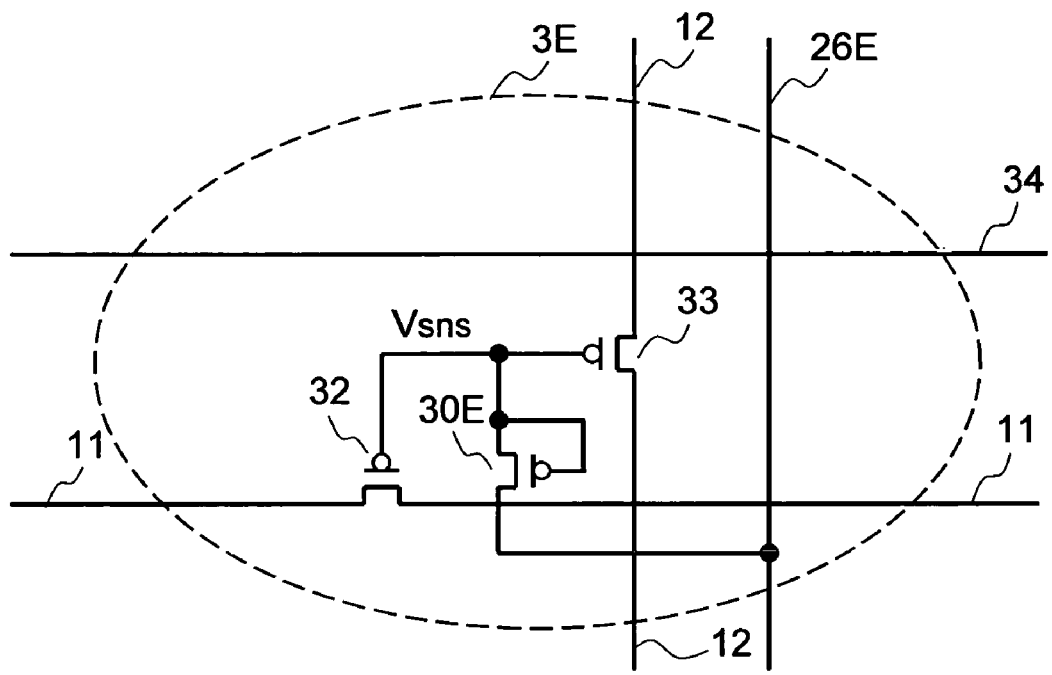
FIG. 18 shows the configuration of an optical detecting element in a fifth embodiment.

FIG. 18 shows the configuration of an optical detecting elements 3E. An optical detection diode 30E, which is configured by diode-connecting a p-type poly-crystal Si-TFT, is connected to a power supply line 26E, and the gate of the X output TFT 33, which is a p-type poly-crystal drive Si-TFT, and the gate of the Y output TFT 32, which is another p-type poly-crystal drive Si-TFT, are connected to the other end of the optical detection diode 30E. The Y output line 11 and the X output line 12 are connected to the two ends of the Y output TFT 32 and to those of the X output TFT 33, respectively.

This embodiment, besides providing the same benefits as the fourth embodiment, has an advantage of permitting fabrication in an all-TFT configuration. Furthermore, a similar configuration is made possible with n-type TFTs instead of p-type TFTs by reversing the voltage relationship. There is another cost advantage that an all p-MOS process or an all n-MOS process can be applied by appropriate combination with the configuration of display pixels.

Embodiment 6

Yet another image display device, which is a sixth preferred embodiment of the present invention, will be described below with reference to FIG. 19 and FIG. 20.

As the basic structure and operation of a personal digital assistance having the optical touch panel, which is the sixth embodiment, are the same as those of the first embodiment already described, and this embodiment differs from the first embodiment in the structure and operation of an X output scanning circuit 14F and an Y output scanning circuit 13F, these differences will be described below.

Figure 19:
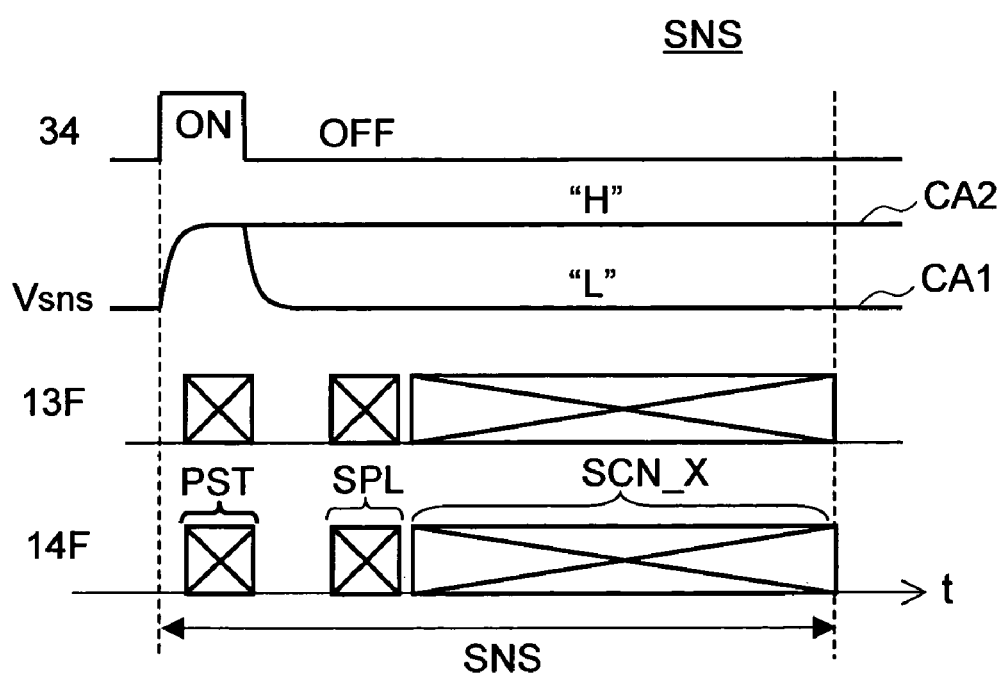
FIG. 19 is an operational timing chart of the detection period in a sixth embodiment.

FIG. 19 is an operational timing chart of the detection period SNS, wherein the upper level of the detection element reset line 34 represents ON and the lower level represents OFF. Incidentally, Vsns denotes the detection voltage, which is the voltage at the two ends of the optical detection diode 30 here, the upper line representing the high voltage and the lower representing the low voltage. The operations of the Y output scanning circuit 13F and the X output scanning circuit 14F are also shown in this chart, but they will be described afterwards with reference to FIG. 20.

This is a period of optical detection, wherein no pixel is lit as every light-up line 4B is turned off.

In this period, first, as the detection element reset line 34 remains on for a certain duration and the detection element reset switch 31 is turned on, a reset voltage is applied to both ends of the optical detection diode 30. After that, when the detection element reset line 34 is turned off and the detection element reset switch 31 is also turned off, the detection voltage Vsns of the optical detection diode 30 remains at the high level "H" if no light comes incident as indicated on (CA1) or drops to the low level "L" if any light comes incident as indicated on (CA2).

As the voltage of the optical detection diode 30 is then applied as it is to the gates of the Y output TFT 32 and the X output TFT 33, which are p-type TFTs, in the case of no light coming incident, the Y output TFT 32 and the X output TFT 33 remain off or, in the case of a light coming incident, the Y output TFT 32 and the X output TFT 33 vary to an ON state. As the Y output TFT 32 and the X output TFT 33 here are connected in series by the Y output line 11 and the X output line 12, respectively, if any of the optical detecting elements 3, which are connected in series, is not irradiated with light or is irradiated only at a low level of brightness, the outputs themselves of the Y output line 11 and the X output line 12 will take on high impedances. By detecting them in the X and Y directions, the address of the optical detecting element 3 not irradiated with light or irradiated only at a low level of brightness can be readily found out.

Next will be described the configuration of this address detection circuit with reference to FIG. 20.

Figure 20:
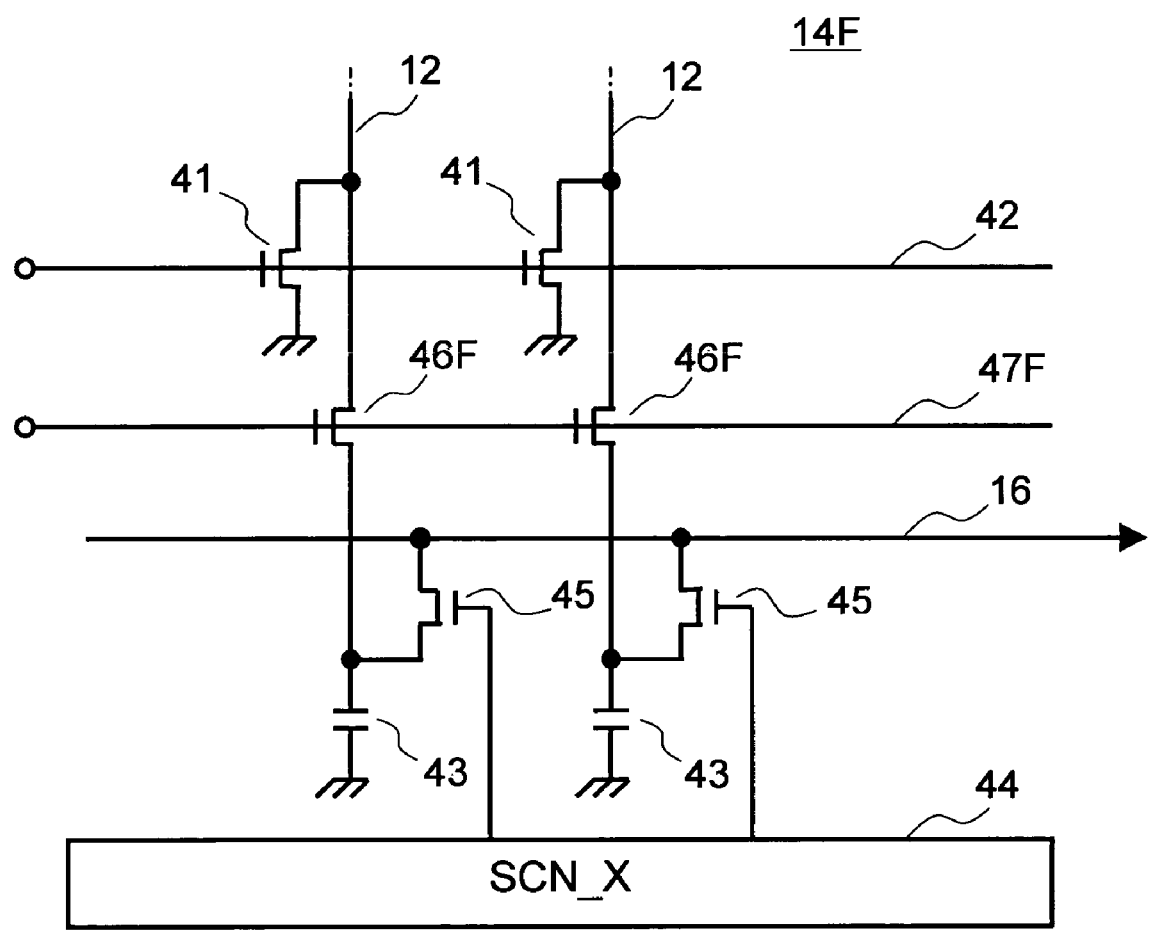
FIG. 20 shows the configuration of the X output scanning circuit in the sixth embodiment.
Figure 21:
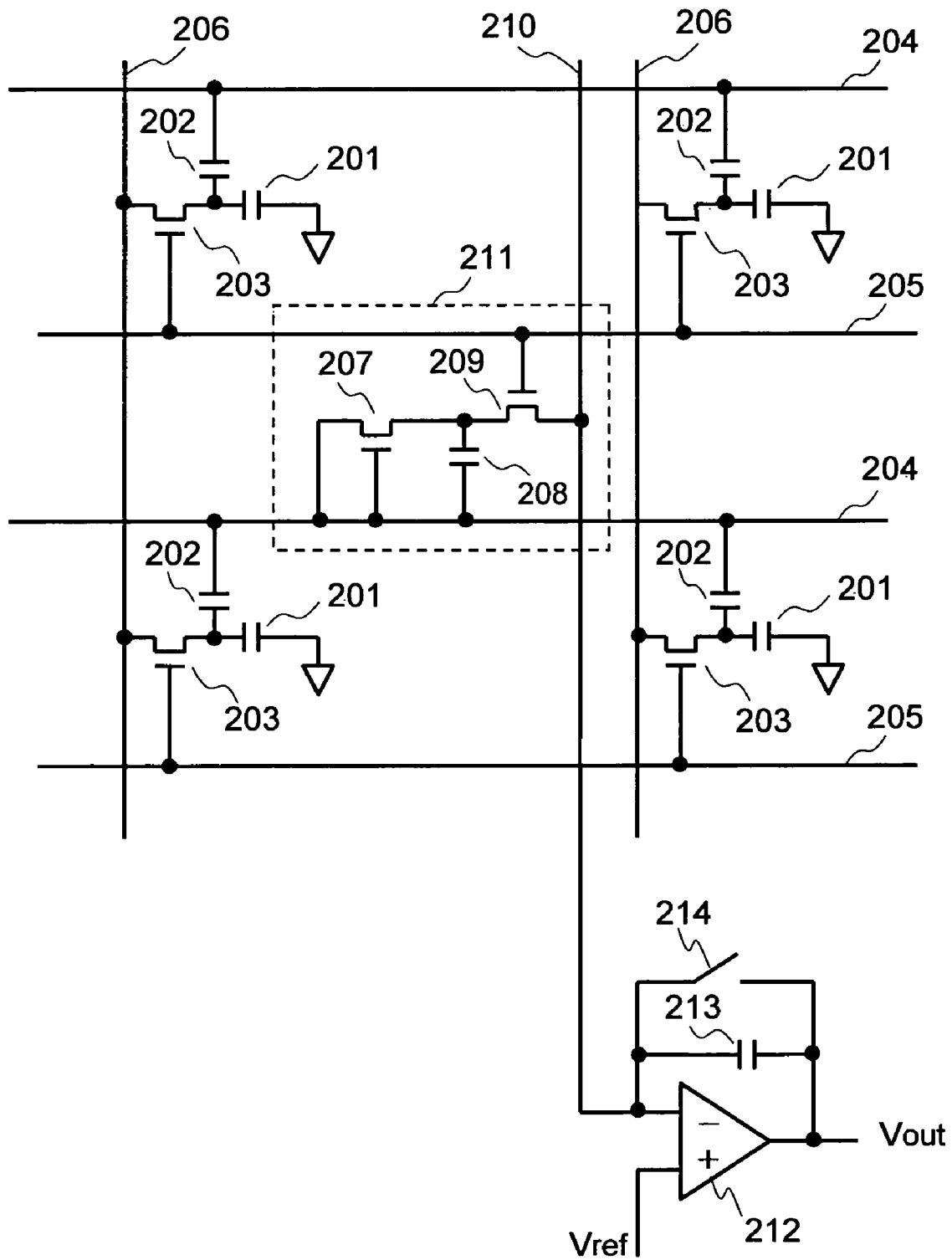
FIG. 21 shows the configuration of a conventional liquid crystal display having optical detecting means.

FIG. 20 shows the configuration of an X output scanning circuit (SCN_X) 14F. The X output line 12 entered in parallel is provided with the preset switch 41 controlled with the preset line 42, while the other end of the preset switch 41 is grounded. The X output line 12 is connected to the X output line capacitor 43 via a sampling switch 46F controlled by a sampling gate line 47F via an X output line capacitor 43, and is further connected to the X signal output line 16 via the X scan switch 45. Incidentally, the gate of the X scan switch 45 here is successively scanned by the X scanning circuit 44.

The X output scanning circuit 14F operates as illustrated in FIG. 19. Exactly when the detection element reset line 34 is turned on, the preset switch 41 controlled by the preset line 42 is turned on to preset (PST) the X output line 12. After that, if the output of the X output line 12 is at a low impedance, the X output line capacitor 43 will be returned to a high voltage by a power source (not shown) connected to the source terminal 10 provided at the other end of the X output line 12, but if the output of the X output line 12 is at a high impedance, the X output line capacitor 43 will remain preset to a low voltage.

By successively sampling (SPL) and storing the capacitances of the X output line capacitors 43 then with the sampling switch 46F controlled by the sampling gate line 47F, and then reading them out successively by scanning with the X scanning circuit (SCN_X) 44, it can be determined whether or not there is any which is not irradiated with light or irradiated only at a low level of brightness among the optical detecting elements 3 on the pertinent line. Incidentally, description of the operation of the Y output scanning circuit 13 is dispensed with here because it is the same as that of the X output scanning circuit 14.

Since the X output line 12 and the Y output line 11 can be sampled at the same point of time in this embodiment, any influence of a difference in scanning time between the X scanning circuit 44 and the Y scanning circuit can avoided, resulting in an advantage of making possible more accurate optical detection.

The invention can eliminate crosstalk between displayed images and optical inputs and provide an image display device having an optical touch panel free from input trouble. Further by integrating this optical touch panel with a display, the image display device can be provided at a lower cost.

What is claimed is:

1. An image display device comprising:
    pixels arranged in a shape of a matrix in a display area;
    optical detecting elements arranged in a shape of a matrix in the display area;
    X output lines disposed in a horizontal direction;
    Y output lines disposed in a vertical direction;
    high voltage power supply lines;
    low voltage power supply lines;
    reset lines;
    a X output scanning circuit; and
    a Y output scanning circuit,
    wherein each of the optical detecting elements comprises an optical detection diode, a reset TFT, a X output TFT and a Y output TFT,
    a path of the optical detection diode is directly connected between one of the high voltage power supply lines and one of the low voltage power supply lines through a source-drain path of the reset TFT,
    a gate of the reset TFT is directly connected to one of the reset lines;
    gates of the X output TFT and the Y output TFT are directly connected to one end of the optical detection diode,
    each of the X output lines is directly connected between a high voltage source terminal and the X output scanning circuit through one of source-drain paths of the X output TFTs, and
    each of the Y output lines is directly connected between the high voltage source terminal and the Y output scanning circuit through one of source-drain paths of the Y output TFTs.

2. An image display device according to claim 1, further comprising a position detection circuit,
    wherein the X output scanning circuit comprises X preset TFTs, a X preset line, X output line capacitors, X scan TFTs, a X signal output line, and a X scanning circuit, the Y output scanning circuit comprises Y preset TFTs, a Y preset line, Y output line capacitors, Y scan TFTs, a Y signal output line, and a Y scanning circuit, gates of the X preset TFTs are connected to the X preset line and each source-drain path of the X preset TFTs is directly connected between one of the X output lines and a ground, each of the X output line capacitors is directly connected between one of the X output lines and the ground, each of the X scan TFTs is directly connected between one of the X output lines and the X signal output line, gates of the Y preset TFTs are directly connected to the Y preset line and each source-drain path of the Y preset TFTs is directly connected between one of the Y output lines and the ground, each of the Y output line capacitors is connected between one of the Y output lines and the ground, each of the Y scan TFTs is directly connected between one of the Y output lines and the Y signal output line, wherein when the reset TFTs turn off, the X scanning circuit scans the gates of the X scan TFTs, the Y scanning circuit scans the gates of the Y scan TFTs, and the position detection circuit extracts touch input address information based on outputs from the X and Y signal outputs lines after the reset TFTs turn on.

3. The image display device according to claim 2, further comprising;

X sampling TFTs;
Y sampling TFTs;
a X sampling gate line; and
a Y sampling gate line, wherein gates of the X sampling TFTs are directly connected to the X sampling gate line, gates of the Y sampling TFTs are directly connected to the Y sampling gate line, each source-drain path of the X sampling TFTs is directly connected between one of the X output lines and one of the X output line capacitors, and each source-drain path of the Y sampling TFTs is directly connected between one of the Y output lines and one of the Y output line capacitors.

4. The image display device according to claim 2, wherein the X output TFT and the Y output TFT are n-type TFTs.

5. The image display device according to claim 2, wherein the X output TFT and the Y output TFT are p-type TFTs.

6. An image display device comprising:
pixels arranged in a shape of a matrix in a display area;
optical detecting elements arranged in a shape of a matrix in the display area;
X output lines disposed in a horizontal direction;
Y output lines disposed in a vertical direction;
power supply lines;
X output scanning circuit; and
Y output scanning circuit, wherein each of the optical detecting elements comprises an optical detection diode, a X output TFT, and a Y output TFT, one end of the optical detection diode is directly connected to one of the power supply lines and the other end of the optical detection diode is directly connected to gates of the X output TFT and the Y output TFT, the X output lines are directly connected between a high voltage source terminal and the X output scanning circuit through one of source-drain paths of the X output TFTs, and the Y output lines are directly connected between the high voltage source terminal and the Y output scanning circuit through one of source-drain paths of the Y output TFTs.

7. An image display device according to claim 6, further comprising a position detection circuit, wherein the X output scanning circuit comprises X preset TFTs, a X preset line, X output line capacitors, X scan TFTs, a X signal output line and a X scanning circuit, the Y output scanning circuit comprises Y preset TFTs, a Y preset line, Y output line capacitors, Y scan TFTs, a Y signal output line, and a Y scanning circuit, gates of the X preset TFTs are directly connected to a X preset line, and each source-drain path of the X preset TFTs is directly connected between one of the X output lines and a ground, each of the X output line capacitors is directly connected between one of the X output lines and the ground, each of the X TFTs is directly connected between one of the X output lines and the X signal output line, gates of the Y preset TFTs are directly connected to a Y preset line, and each source-drain path of the Y preset TFTs is directly connected between one of the Y output lines and the ground;

each of the Y output line capacitors is directly connected between one of the Y output lines and the ground, each of the Y scan TFTs is directly connected between one of the Y output lines and the Y signal output line, wherein when the reset TFTs turn off, X scanning circuit scans the gates of the X scan TFTs, Y scanning circuit scans the gates of the Y scan TFTs, and the position detection circuit extracts touch input address information based on outputs from the X and Y signal outputs lines after the reset TFTs turn on.

8. The image display device according to claim 7, further comprising;

X sampling TFTs;
Y Sampling TFTs;
a X sampling gate line; and
a Y sampling gate line, wherein gates of the X sampling TFTs are directly connected to the X sampling gate line, gates of the Y sampling TFTs are directly connected to the Y sampling gate line, each source-drain path of the X sampling TFTs is directly connected between one of the X output lines and one of the X output line capacitors, and each source-drain path of the Y sampling TFTs is directly connected between one of the Y output lines and one of the Y output line capacitors.

9. The image display device according to claim 6, wherein the X output TFTs and the Y output TFTs are n-type TFTs.

10. The image display device according to claim 6, wherein the X output TFTs and the Y output TFTs are p-type TFTs.

* * * * *